UNITED STATES PATENT OFFICE.

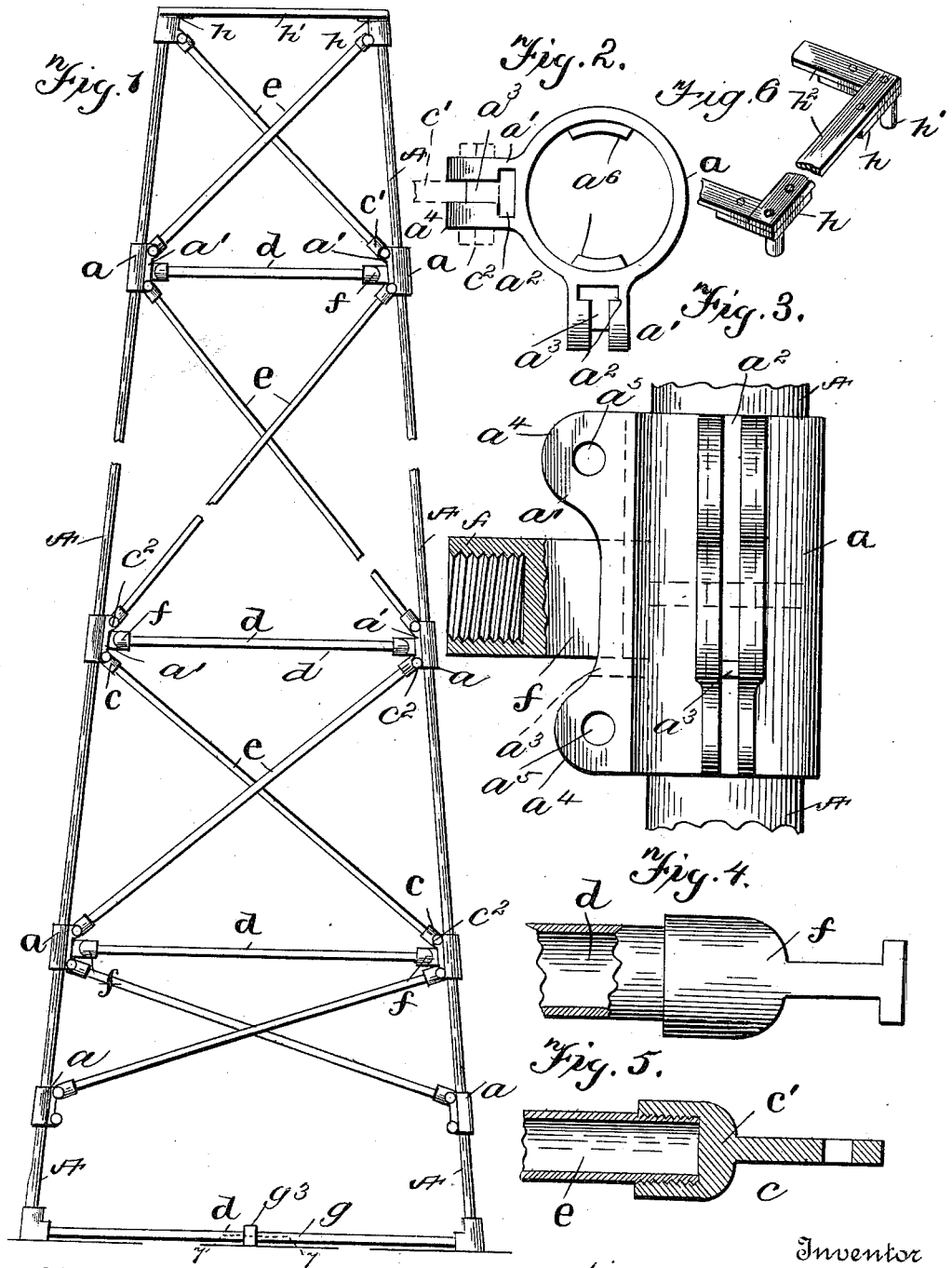

AMOS C. WILSON, OF BUTLER, PENNSYLVANIA.

DERRICK-FRAME.

SPECIFICATION forming part of Letters Patent No. 566,364, dated August 25, 1896.

Application filed August 16, 1895. Serial No. 559,568. (No model.)

*To all whom it may concern:*

Be it known that I, AMOS C. WILSON, a citizen of the United States, residing at Butler, in the county of Butler and State of Pennsylvania, have invented certain new and useful Improvements in Derrick-Frames; and I do hereby declare the following to be a full, clear, and exact description of the invention, such as will enable others skilled in the art to which it appertains to make and use the same.

My invention relates to an improved derrick-frame; and it consists in connecting a series of standards by couplings provided with two T-shaped slots at right angles to each other. Each of these slots is designed to fit the T ends of girders. I further provide perforated ears at the upper and lower ends of the flanges forming the sides of the T-slots. Connecting-rods are designed to be secured between the perforated ears for the purpose of bracing the frame.

The invention further consists in details of construction which will be described hereinafter and clearly pointed out in the claim.

In the drawings, Figure 1 is a side elevation of a derrick-frame constructed in accordance with my invention. Fig. 2 is a plan view of one of the couplings or joints used in the construction of my invention. Fig. 3 is a side view thereof. Fig. 4 is a detail plan view of a girder and socket. Fig. 5 is a detail plan view of a socket and brace-rod. Fig. 6 is a detail view. Fig. 7 is a detail section on the line 7 7 of Fig. 1.

Similar letters of reference indicate like parts in all the figures.

A A indicate the different sections of upright standards of a derrick-frame, connected at their ends to like sections by couplings $a$. The couplings are preferably circular in cross-section and have projecting outwardly and at right angles to each other two pairs of flanges $a'$, between which are formed T-slots $a^2$. A flange $a^3$ connects the side flanges and forms the bottom of the T-slots. At the upper and lower portions of the flange $a'$ are formed ears $a^4$, provided with perforations $a^5$. Projections $a^6$ are formed within the circular portion of the couplings, against which the sections forming the standards abut. Socket-pieces $f$, having T ends, fit within the T-slots in the couplings, and the opposite ends of the sockets are provided with screw-threads, into which screw the threaded ends of girders $d$. The flat ends $c$ of socket-pieces $c'$ are securely held between the ears $a^4$, and are held therein by bolts $c^2$. Cross-braces $e$ are screwed into the enlarged screw-threaded ends of the socket-pieces $c'$. Lower girders $g$ are provided, having T ends which fit within corresponding slots in the couplings $g'$. Braces $g^2$ connect these cross-bars. Said braces are screwed into caps or couplings $g^3$, which are screwed to the lower girders.

When the derrick-frame has reached the desired height, I provide a suitable cap, which consists of four angular plates $h$, provided with downwardly-projecting lugs $h'$, which fit within the uppermost couplings. Connecting-plates $h^2$ connect the angular plates and securely hold the parts together.

It is thought the advantages of my invention will be apparent. When it is desired to construct a derrick-frame, the lower girders are first put in place and sections of standards are placed within the couplings, and upon the upper ends of the sections of the first set of standards are placed a second series of couplings, from which extend cross-bars, which are secured by bolts to the ears on the side of the couplings placed above the aforesaid set. When the third series of couplings have been placed in position, the girders $d$ are inserted in the slots $a^2$ and securely unite the parts. Cross-pieces $e$ are then placed in position and connected to the next corresponding set of ears on the succeeding couplings. When the derrick-frame has reached the desired height, the cap is put in place, and a derrick-frame is constructed which is simple in construction and is easily and conveniently put up or taken down.

The various parts are made of pipe, but, if desired, solid bars may be used.

With a derrick-frame constructed as described it will be impossible for the parts to rust and thus necessitate the breaking of the various details when it is desired to take down the derrick-frame in order to remove it to other parts or store it.

I desire it to be understood that I reserve the right to make changes in the details of construction, such as securing the girders with pins and likewise the brace-rods to the couplings, and other minor details, without departing from the spirit and scope of my invention.

Having thus described my invention, what I claim is—

In a derrick-frame, the combination of upright pieces, horizontal girders, diagonal brace-pieces and coupling-sleeves, each of the latter being provided with flanged T-slots: said girders provided with T-heads adapted to fit the T-slots of the coupling-sleeves: the brace-pieces also fitting in said grooves and pins securing said braces therein, said coupling being also provided with interior projections, adapted to receive and support the uprights of the derrick, substantially as and for the purpose set forth.

AMOS C. WILSON.

Witnesses:
ALBERT L. BOWSER,
Mrs. N. C. CORE.